(12) United States Patent
Byrne et al.

(10) Patent No.: US 10,089,794 B2
(45) Date of Patent: Oct. 2, 2018

(54) SYSTEM AND METHOD FOR DEFINING AN AUGMENTED REALITY VIEW IN A SPECIFIC LOCATION

(71) Applicant: Membit Inc., New York, NY (US)

(72) Inventors: John Christopher Byrne, Stanhope, NJ (US); Andrew Herbert Byrne, San Francisco, CA (US); Jennifer Mary Byrne, Washington, NJ (US)

(73) Assignee: Membit Inc., New York, NY (US)

( * ) Notice: Subject to any disclaimer, the term of this patent is extended or adjusted under 35 U.S.C. 154(b) by 0 days.

(21) Appl. No.: 15/689,804

(22) Filed: Aug. 29, 2017

(65) Prior Publication Data

US 2018/0232953 A1    Aug. 16, 2018

Related U.S. Application Data

(63) Continuation of application No. 14/805,059, filed on Jul. 21, 2015, now Pat. No. 9,779,553, which is a
(Continued)

(51) Int. Cl.
*G09G 5/00* (2006.01)
*G06T 19/00* (2011.01)
(Continued)

(52) U.S. Cl.
CPC .............. *G06T 19/006* (2013.01); *G06T 7/30* (2017.01); *G06T 7/74* (2017.01); *G06T 15/503* (2013.01); *G06T 17/00* (2013.01); *G06T 2207/10016* (2013.01); *G06T 2207/20092* (2013.01); *G06T 2207/30244* (2013.01); *G06T 2210/62* (2013.01)

(58) Field of Classification Search
CPC .............. G06T 19/006; G06T 2210/62; G06T 2207/10016; G06T 2207/20092; G06T 2207/30244; G06T 17/00; G06T 7/30; G06T 7/74; G06T 15/503
See application file for complete search history.

(56) References Cited

U.S. PATENT DOCUMENTS

| 8,660,369 B2 | 2/2014 | Llano et al. |
| 8,963,957 B2 | 2/2015 | Skarulis |
(Continued)

OTHER PUBLICATIONS

Augmentedreality (2011) "Implementing Mobile Augmented Reality Technology for Viewing Historic Images"; Azavea and City of Philadelphia Department of Records; pp. 1-26; http://www.azavea.com/research/company-research/augmented-reality/.
(Continued)

*Primary Examiner* — Robert Craddock
(74) *Attorney, Agent, or Firm* — Michael B. Rubin; Bozicevic, Field & Francis LLP

(57) ABSTRACT

This invention is a system and method for defining a location-specific augmented reality capability for use in portable devices having a camera. The system and method uses recent photographs or digital drawings of a particular location to help the user of the system or method position the portable device in a specific place. Once aligned, a digital scene is displayed to the user transposed over (and combined with) the camera view of the current, real-world environment at that location, creating an augmented reality experience for the user.

7 Claims, 8 Drawing Sheets

Related U.S. Application Data continuation of application No. 13/849,546, filed on Mar. 25, 2013, now Pat. No. 9,117,303.

(60) Provisional application No. 61/615,321, filed on Mar. 25, 2012.

(51) Int. Cl.
    *G06T 17/00* (2006.01)
    *G06T 7/30* (2017.01)
    *G06T 7/73* (2017.01)
    *G06T 15/50* (2011.01)

(56) References Cited

U.S. PATENT DOCUMENTS

| | | |
|---|---|---|
| 9,117,303 B2 | 8/2015 | Byrne et al. |
| 9,779,553 B2 | 10/2017 | Byrne et al. |
| 2010/0079488 A1 | 4/2010 | McGreevy et al. |
| 2012/0068913 A1 | 3/2012 | Bar-Zeev et al. |
| 2012/0113144 A1 | 5/2012 | Adhikari et al. |
| 2012/0120103 A1 | 5/2012 | Border et al. |
| 2012/0206577 A1 | 8/2012 | Guckenberger et al. |
| 2012/0256917 A1 | 10/2012 | Lieberman et al. |
| 2012/0299950 A1 | 11/2012 | Ali et al. |
| 2013/0083011 A1 | 4/2013 | Geisner et al. |
| 2013/0278631 A1* | 10/2013 | Border .......... G02B 27/017 345/633 |
| 2014/0099022 A1 | 4/2014 | McNamer |

OTHER PUBLICATIONS

Baillot et al.; "A Tracker Alignment Framework for Augmented Reality"; ACM International Symposium on Mixed and Augmented Reality; (Dec. 2003); pp. 1-9.

Malek et al.; "Calibration Method for an Augmented Reality System"; International Scholarly and Scientific Research & Innovation 2(9); (Dec. 2008); pp. 2988-2993.

"New mobile app uses augmented reality to enhance learning experiences at historic sites"; Virginia Tech News; May 5, 2014; pp. 1-3; http://www.vtnews.vt.edu/articles/2014/05/050514-engineering-historyappcburg.html.

Van Krevelen and Poelman; "A survey of augmented reality technologies, applications and limitations"; Int. J. Virtual Reality 9; pp. 1-20 (Dec. 2010).

Zhang, Michael; "Museum of London Releases Augmented Reality App for Historical Photos"; PetaPixel; May 24, 2010; pp. 1-10; http://petapixel.com/2010/05/24fmuseum-of-london-releases-augmented-reality-app-for-historical-photos/.

\* cited by examiner

SYSTEM AND METHOD FOR DEFINING AN AUGMENTED REALITY VIEW IN A SPECIFIC LOCATION

CROSS-REFERENCE TO RELATED APPLICATIONS

This application claims the benefit of U.S. Provisional Patent Application No. 61/615,321 filed by the same inventors on Mar. 25, 2012.

FEDERALLY SPONSORED RESEARCH OR DEVELOPMENT

Not Applicable

JOINT RESEARCH AGREEMENT

Not applicable

BACKGROUND OF THE INVENTION

(1) Field of the Invention

This invention relates to computerized virtual reality capabilities in specific locations. This invention further relates to using computer graphics processing and selective visual display systems. This invention is specifically a system and method for defining a means to show augmented reality scenes in specific locations.

This invention is intended to be employed for technical uses and solutions when a specific location is required, for AR applications such as gaming and social networking, as well as for educational and entertainment uses such as viewing a historical image or model in a historically accurate location.

(2) Description of Related Art Including Information Disclosed Under 37 CFR 1.97 and 37 CFR 1.98

Augmented reality (AR) is a live, direct or indirect, view of a physical, real-world environment whose elements are augmented by computer-generated sensory input such as sound, video, graphics or GPS data. It is related to a more general concept called mediated reality, in which a view of reality is modified by a computer. As a result, the technology functions by enhancing one's current perception of reality. By contrast, virtual reality replaces the real world with a simulated one.

Augmentation is conventionally in real-time and in semantic context with environmental elements, such as sports scores on TV during a match. With the help of advanced AR technology (e.g. adding computer vision and object recognition) the information about the surrounding real world of the user becomes interactive and digitally manipulable. Artificial information about the environment and its objects can be overlaid on the real world.

The AR field is divided into these major areas from an algorithmic standpoint:
  marker-based
  positional-based
  object/feature recognition Marker-based augmented reality is based on the computer identifying artificial markers in the real world (examples: QR codes, barcodes, or similar markers) and superimpose computer-generated images based on where the markers are located. This area requires significant image processing tasks done by the computer.

Positional-based augmented reality is based on where you are located, where you are pointing to (as in heading), and where are the objects of interest are located relative to you. The computer then will superimpose images on top of the real-world image gathered. The computer doesn't need to do much image processing (almost none at all) except for superimposing the generated image on top of the camera image.

Object/feature recognition is the process whereby the computer will recognize real-world objects directly and thus the markers are no longer needed, but it is still a topic that requires much research.

Traditional object/feature recognition and positional based processing is processing that is intensive and highly inaccurate. To some extent this is also true of marker based systems. One problem associated with marker tags is that they must be visible and easily recognized for the camera to recognize and interpret.

BRIEF SUMMARY OF THE INVENTION

A system and method for defining a location-specific augmented reality capability for use in portable devices having a camera. The method uses recent photographs or digital drawings of a particular location to help the user of the system or method position the portable device in a specific place. Once aligned, a digital scene is displayed to the user transposed over (and combined with) the camera view of the current, real-world environment at that location.

DETAILED DESCRIPTION OF THE INVENTION

The following description of the invention is merely exemplary in nature and is not intended to limit the invention or the application or uses of the invention.

This invention is a system and method designed to manage and display digital scenes or images related to a specific location and place, and merged with the current, real-world environment at that specific location.

Figure 1:
FIG. 1 illustrates the user aligning the superimposed Digital Image Marker on the Viewer Context, in this embodiment on a mobile device, in a Particular Location.

Referring to FIG. 1, the invention uses specially created images (i.e. Digital Marker Images) to position a Viewer Context in a Particular Location.

One embodiment of this invention uses the sequence of images presented to a user through the camera function on a Smartphone or other portable device as the Viewer Context. Therefore, this embodiment of the invention positions the user of the invention in a specific place, looking through their Smartphone or portable device in a specific direction.

Figure 1A:
FIG. 1A illustrates the user indicating the device is properly aligned with the Digital Image Marker.
Figure 1B:
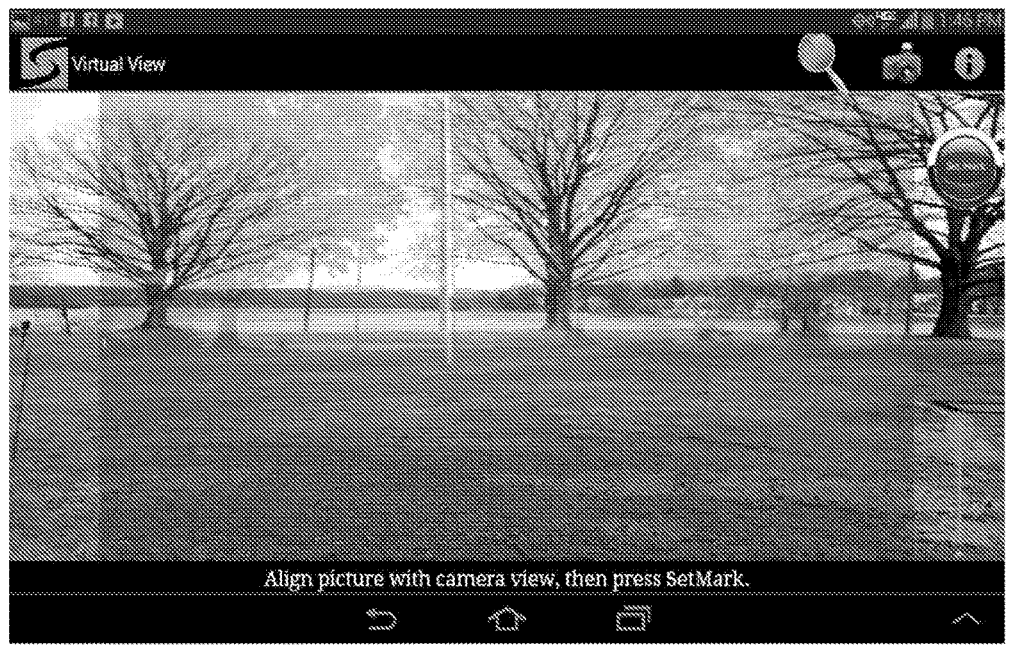
FIG. 1B illustrates a screenshot of the Digital Image Marker superimposed on the Viewer Context, in a Particular Location.

Referring to FIG. 1B, the invention allows the user of the invention to view the Marker Image as an overlay in the current Viewer Context.

Referring to FIG. 1A, the invention allows the user of the invention to indicate that they are positioned properly.

Figure 2:
FIG. 2 illustrates the user in a Particular Location viewing the Digital Artifact being superimposed with low opacity on the Viewer Context of a mobile device.

Referring to FIG. 2, after the user indicates they are positioned properly, the invention then will display a Digital Artifact to the user. The Digital Artifact that is displayed is associated in some manner with the Particular Location.

Figure 2A:
FIG. 2A illustrates a screenshot of the Digital Artifact being superimposed with low opacity on the Viewer Context of a mobile device in a Particular Location.

Referring to FIG. 2A, the invention allows the user to view the current, real-world environment simultaneously, or merged with, the Digital Artifact.

Figure 3:
FIG. 3 illustrates the user in a Particular Location viewing the Digital Artifact being superimposed with high opacity on the Viewer Context of a mobile device.
Figure 3A:
FIG. 3A illustrates a screenshot of the Digital Artifact being superimposed with high opacity on the Viewer Context, in this embodiment on a mobile device, in a Particular Location.
Figure 4:
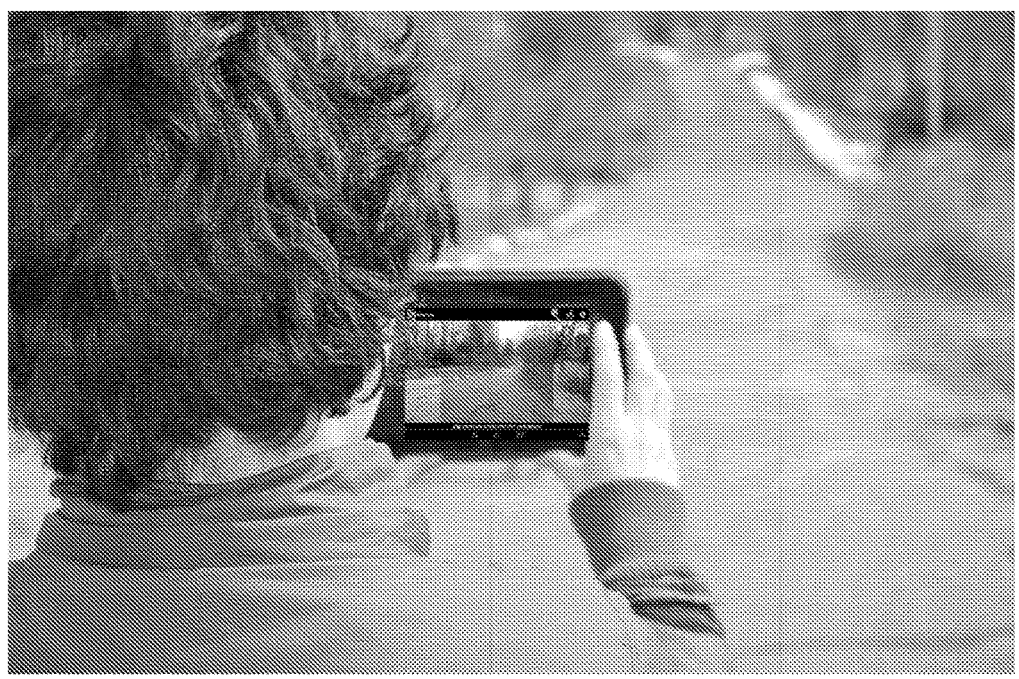
FIG. 4 illustrates the user aligning the superimposed Digital Image Marker on the Viewer Context, in this embodiment on a mobile device, in a different Particular Location.
Figure 4A:
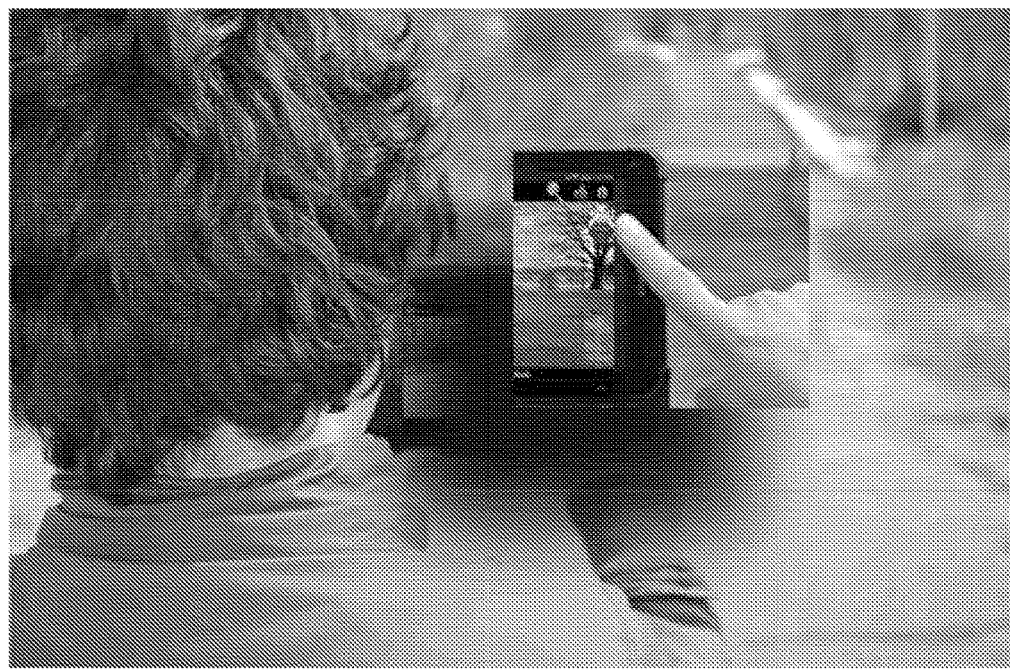
FIG. 4A illustrates the user indicating the device is properly aligned with the Digital Image Marker, in a different Particular Location.
Figure 4B:
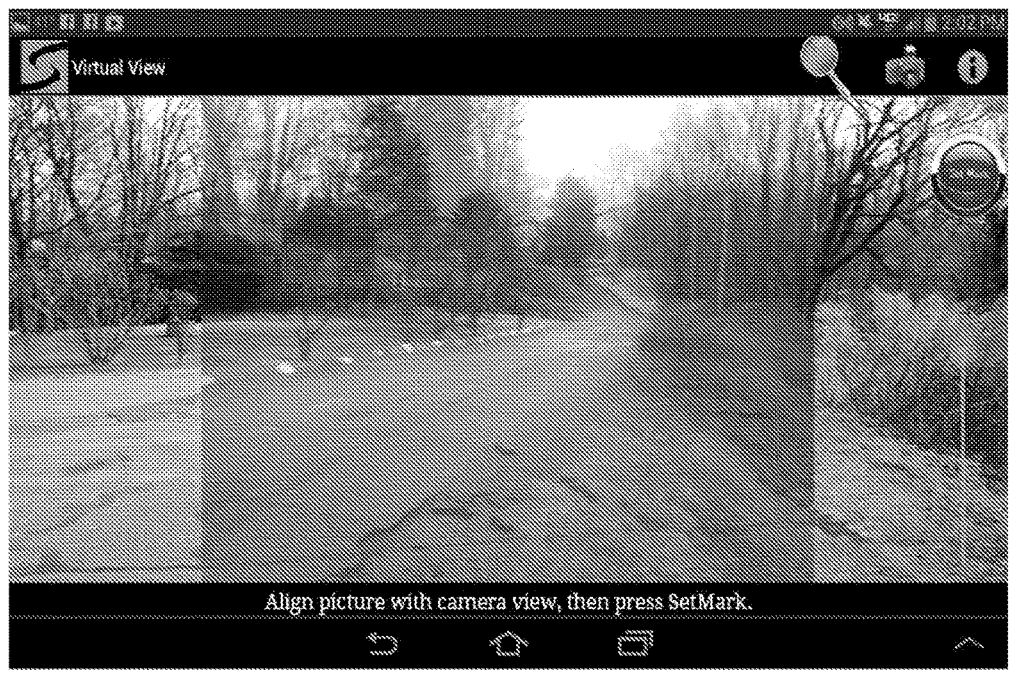
FIG. 4B illustrates a screenshot of the Digital Image Marker superimposed on the Viewer Context, in a different Particular Location.
Figure 5:
FIG. 5 illustrates the user in a different Particular Location viewing the Digital Artifact being superimposed with low opacity on the Viewer Context of a mobile device.
Figure 5A:
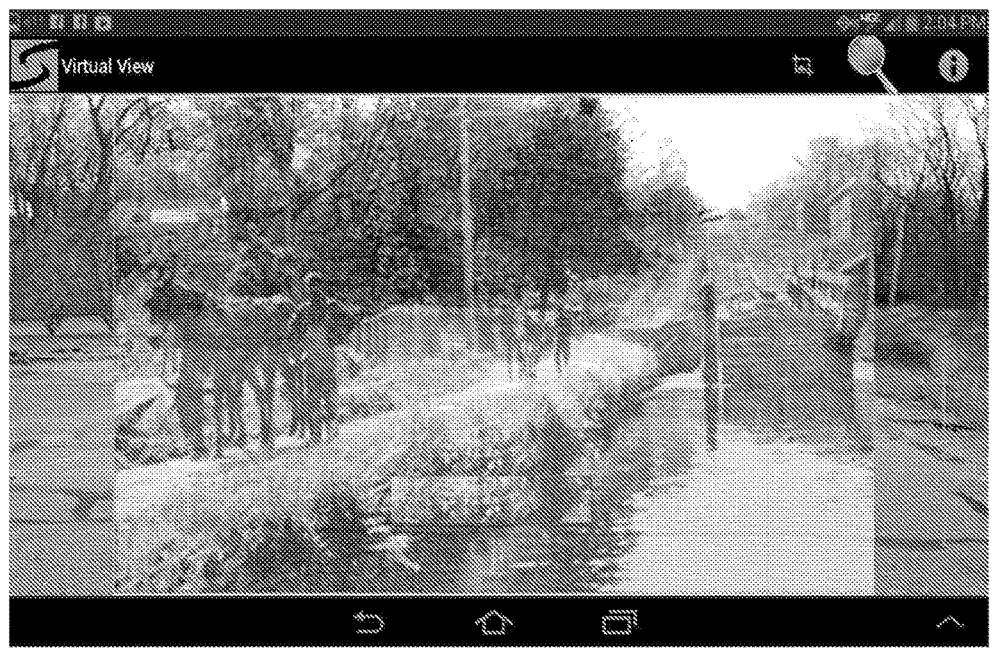
FIG. 5A illustrates a screenshot of the Digital Artifact being superimposed with low opacity on the Viewer Context of a mobile device in a different Particular Location.
Figure 6:
FIG. 6 illustrates the user in a different Particular Location viewing the Digital Artifact being superimposed with high opacity on the Viewer Context of a mobile device.
Figure 6A:
FIG. 6A illustrates a screenshot of the Digital Artifact being superimposed with high opacity on the Viewer Context, in this embodiment on a mobile device, in a different Particular Location.

Referring to FIGS. 3 and 3A, while the Digital Artifact is displayed, and as the user changes the Viewer Context (in this embodiment, an opacity control is manipulated), the Digital Artifact may be modified or repositioned in the Viewer Context as well.

Figure 7:
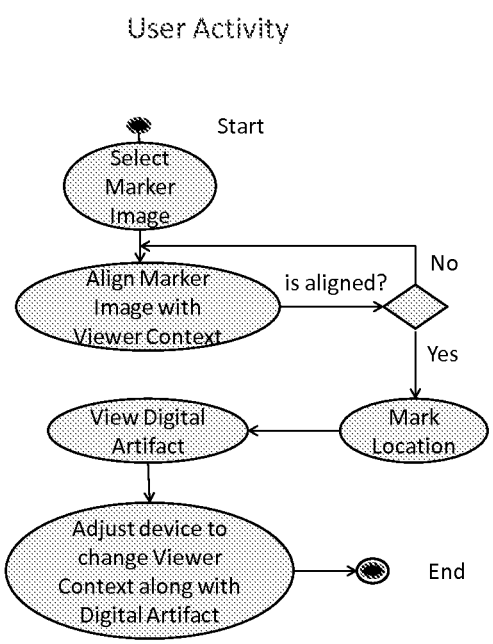
FIG. 7 illustrates the steps an end user of the invention would perform to use the invention.

Referring to FIG. 7, the invention provides a sequence of steps. The end user can navigate through those steps to:
  Position their device in the proper location
  Indicate that the device is positioned properly
  View the Digital Artifact combined with the current Viewer Context
  Adjust the view to observe changes in the Digital Artifact

Definitions

Particular Location definition:
A Particular Location is defined for the purposes of this invention to be the combination of a specific place in the world, including a particular azimuth and altitude, relative to the observer.

Viewer Context definition:
A Viewer Context is defined for the purposes of this invention to be the digital representation of an actual scene, presented on a portable device. A Viewer Context is dynamic, and responds rapidly to new information from the scene, as the device is moved.

The most common Viewer Context for this invention is the sequence of images presented to a user through the camera function on a Smartphone or other portable device.

Content definition:
Content for the purposes of this invention consists of two types of digital assets:
  a) A Digital Marker Image that is used to help the user of the invention position the Viewer Context in a Particular Location.
  b) A Digital Artifact that is displayed in the Viewer Context after a Particular Location has been acquired by the invention. This artifact adds to the user's viewing experience while looking at a Particular Location.

Digital Marker Images definition:
As defined in this document, Digital Marker Images are used to help the user position the Viewer Context in a Particular Location. The Digital Marker Image is added to, or presented in the Viewer Context as a semi-transparent layer, superimposed on the Viewer Context (e.g., the view acquired in real-time from a camera on a supported device). The Digital Marker Image is, in some manner, related to the Viewer Context for a Particular Location. The Digital Marker Image helps the user align the Viewer Context with a Particular Location.

Several types of Digital Marker Images are supported, including:
  a) A digital picture of the Particular Location, taken recently.
  b) A digitized 2 dimensional drawing that highlights unique characteristics of the particular location.

Digital Marker Image Characteristics:
Several types of Digital Marker Images are supported by the invention. Each marker must contain these characteristics or provide these features:
  a) Contain unique features (i.e. unique attributes or shapes) that relate to those observed in the scene presented in the Viewer Context, and are readily recognizable by the user.
  b) Are semi-transparent, so that the user can observe both the Digital Marker Image and the Viewer Context.

Digital Artifact definition:
Digital Artifacts are added to, or presented in the Viewer Context after a Particular Location has been acquired. Digital Artifacts add to the user's visual experience and present additional information to the user about the Particular Location.

Several types of Digital Artifacts are supported by the invention, including:
  a) A digital picture of the Particular Location, taken at some point in the past.
  b) A digitized 2 dimensional drawing associated with the Particular Location.
  c) A digitized 3 dimensional model associated with the Particular Location.

Digital Artifact characteristics:
Several types of Digital Artifacts are supported by the invention.

Each Digital Artifact must contain these characteristics or provide these features:
  a) Is related to the Particular Location, in some manner. In one embodiment, the Digital Artifact may be a historical image or model, representing what that Particular Location looked like in the past. Or, in another embodiment, the Artifact can represent what that location will look like in the future. In a further embodiment, the Artifact would also be an artistic enhancement that adds information to the context.

c) Allow some portion or portions of the Viewer Context to remain visible. This is so that the user can still see some portion of the Viewer Context while the Digital Artifact is displayed.

Digital Artifacts may contain these characteristics or provide these features:

a) Contain attributes or shapes that augment those observed in the Viewer Context, and add to or enhance the information presented to the user.

b) Obscure portions of the Viewer Context with content from the artifact.

c) Digital Artifacts can be either semi-transparent or non-transparent.

d) Allow the system to rotate, resize or reposition the Artifact in response to changes in the Viewer Context. Examples of changes include moving closer to or further from the Particular Location, or changing the altitude or azimuth of the Viewer Context.

OBJECTS ADVANTAGES OF THE INVENTION

It is an object of the present invention to provide an improved marker for AR applications.

It is another object of the present invention to provide a system whereby handheld and portable computing devices having cameras and image processing technology such as cell phones and tablets can be used in AR enabled applications.

Another object of the invention is to enhance identification of specific locations with limited computer processing requirements.

It is a further object of the invention to provide a method for defining an AR scene in a computer AR application such as an application to view historical images in historically accurate locations.

Additional objects, advantages and novel features of the invention will be set forth in part of the description which follows, and in part will become apparent to those skilled in the art upon examination of the following specification.

A unique feature of this invention is the ability to use digital marker images to help the user of the invention to position the device in a particular location. Once that particular location is viewable to the user of the invention in the viewer context, the invention will display a specific digital artifact to the user.

What is claimed is:

1. A system for defining an augmented reality capability for a portable computer, said system comprising:
a) a portable camera having the ability to show the current real-world environment;
b) a portable computer having the ability to show images, drawings, and models;
c) a software program executed by said computer processor for managing the display of said images, drawings, and models;
d) a set of controls whereby the user can interact with the computer program;
e) an extensible collection of marker images containing a plurality of marker images that represent a specific view of a particular location; and
f) an extensible collection of digital artifacts containing a plurality of digital artifacts that are associated with a specific view of a particular location;

wherein:
a) a user of the system requests a particular marker image within the set of marker images;
b) the user of the system aligns the digital marker image and the current real-world environment as viewed through the camera;
c) the user of the system indicates the camera and the digital marker image are aligned;
d) the system displays a digital artifact associated with that particular location;
e) the user of the system views the digital artifact and the current real-world environment simultaneously;
f) the user of the system manipulates the camera view with the provided controls; and
g) the user of the system views an adjusted digital artifact and the current real-world environment simultaneously.

2. The system of claim 1, wherein said marker images comprise:
a) a digital picture of a particular location, taken recently; or
b) a digitized 2 dimensional drawing that highlights unique characteristics of the particular location.

3. The system of claim 1, wherein said marker images
a) contain unique features (i.e. unique attributes or shapes) that relate to those observed in the scene presented in the viewer context, and are readily recognizable by the user; and
b) are semi-transparent, so that the user can observe both the digital marker image and the viewer context.

4. The system of claim 1, wherein said digital artifacts
a) can be added to, or presented in the viewer context after a particular location has been acquired; and
b) add to the user's visual experience and present additional information to the user about the particular location.

5. The system of claim 1, wherein said digital artifacts comprise:
a) a digital picture of the particular location, taken at some point in the past;
b) a digitized 2 dimensional drawing associated with the particular location; or
c) a digitized 3 dimensional model associated with the particular location.

6. The system of claim 1, wherein said digital artifacts
a) are related to the particular location, in some manner; and
b) allow some portion or portions of the viewer context to remain visible.

7. The system of claim 1, wherein said digital artifacts may have these characteristics:
a) contain attributes or shapes that augment those observed in the viewer context, and add to or enhance the information presented to the user;
b) obscure or partly obscure portions of the viewer context with content from the artifact; or
c) allow the system to rotate, resize, or reposition the artifact in response to changes in the viewer context.

* * * * *